(12) United States Patent  
Saito

(10) Patent No.: US 8,523,176 B2  
(45) Date of Patent: Sep. 3, 2013

(54) MOVEMENT ROLLER, AND BELT DRIVING DEVICE AND IMAGE FORMING DEVICE USING SAME

(75) Inventor: Jun Saito, Toyokawa (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 91 days.

(21) Appl. No.: 13/084,602

(22) Filed: Apr. 12, 2011

(65) Prior Publication Data

US 2011/0260394 A1     Oct. 27, 2011

(30) Foreign Application Priority Data

Apr. 27, 2010   (JP) ................................. 2010-101555

(51) Int. Cl.
*B65H 43/04* (2006.01)
*G03G 15/00* (2006.01)

(52) U.S. Cl.
USPC ............ 271/198; 399/165; 198/835; 226/190

(58) Field of Classification Search
USPC ................. 198/840, 835, 834, 806; 271/275, 271/198; 399/165; 226/190
See application file for complete search history.

(56) References Cited

U.S. PATENT DOCUMENTS

| | | | | |
|---|---|---|---|---|
| 3,643,791 A | * | 2/1972 | Thornsbery | 198/835 |
| 3,772,931 A | * | 11/1973 | Conrad et al. | 474/189 |
| 3,888,131 A | * | 6/1975 | Reid | 198/843 |
| 4,832,186 A | * | 5/1989 | Conrad | 198/840 |
| 5,011,060 A | * | 4/1991 | Cramer | 226/15 |
| 5,431,321 A | * | 7/1995 | Link et al. | 226/194 |
| 5,626,337 A | * | 5/1997 | Iseki | 271/198 |
| 7,194,227 B2 | * | 3/2007 | Yu | 399/165 |

FOREIGN PATENT DOCUMENTS

| | | |
|---|---|---|
| JP | 2005-035722 A | 2/2005 |
| JP | 2008-139638 A | 6/2008 |
| JP | 2009-264447 A | 11/2009 |

OTHER PUBLICATIONS

Office Action (Notification of Reasons for Refusal) dated Mar. 6, 2012, issued in the corresponding Japanese Patent Application No. 2010-101555, and an English Translation thereof. (7 pages).

* cited by examiner

*Primary Examiner* — Luis A Gonzalez
(74) *Attorney, Agent, or Firm* — Buchanan Ingersoll & Rooney PC

(57) ABSTRACT

A protrusion (13*a*) and a protrusion (13*b*) are formed a predetermined distance apart in the direction of a shaft in the outer circumferential surface of the roller main body (11). The cross sections of the protrusion (13*a*) and the protrusion (13*b*) are shaped such that a center portion of the roller main body (11) in the direction of the shaft is a boundary (14), and that on the left side of the boundary (14), a vertex (131*a*) is displaced to the left side from the perpendicular bisector (133*a*) of an opposite side (132*a*) whereas on the right side of the boundary (14), a vertex (131*b*) is displaced to the right side from the perpendicular bisector (133*b*) of an opposite side (132*b*). In this way, in a metallic movement roller that moves a strung endless belt, the winding movement and the like of the belt can be prevented, and the belt can be intentionally moved in a specific direction.

19 Claims, 4 Drawing Sheets

MOVEMENT ROLLER, AND BELT DRIVING DEVICE AND IMAGE FORMING DEVICE USING SAME

This application is based on Japanese Patent Application No. 2010-101555 filed on Apr. 27, 2010, the contents of which are hereby incorporated by reference.

BACKGROUND OF THE INVENTION

1. Field of the Invention

The present invention relates to a metallic movement roller that moves a strung endless belt, and to a belt driving device and an image forming device that use such a movement roller.

2. Description of the Related Art

Conventionally, in various fields, an endless belt strung over a plurality of rollers is rotated to transport goods and the like. For example, in an image forming device such as a copying machine, a printer, a facsimile or the like, there are used an intermediate transfer belt for superimposing toner images of a plurality of colors and thereby forming a full color image, a fixing belt that heats toner images in a fixing device, a paper sheet transport belt for transporting a paper sheet which is a transfer member and other components.

Here, the endless belt strung over the rollers is likely to be moved in the direction of the shaft of the rollers depending on conditions such as the inclination and the dimensions of the rollers that are installed. When the endless belt is moved in the direction of the shaft of the rollers, the endless belt moves windingly or obliquely, the endless belt is displaced to one side of the direction of the shaft or its surface become crinkled or wavy. When the endless belt moves windingly or the like as described above, this usually causes a failure of transport of a transport item or poor timing of transport. The endless belt is also likely to be damaged, and this affects the life of the belt.

To overcome these problems, for example, Japanese Unexamined Patent Application Publication No. 2008-139638 proposes a roller in which a grindstone is used to grind the surface of the roller and thus the grinding direction is changed at a predetermined position in the direction of a shaft. This utilizes the fact that tiny scale-shaped splinters are formed obliquely with respect to the direction of rotation on the surface of the roller by grinding and that, when the roller is moved in the direction of the shaft at the time of rotation, a movement resistance force is produced on the endless belt.

However, when a metallic roller is used, even with the processing proposed above, it is impossible to sufficiently reduce the winding movement of the belt and the like.

The present invention is made in view of the conventional problems described above; an object of the present invention is to provide a metallic roller that can reduce the winding movement of a belt and the like to a level enough for practical use.

SUMMARY OF THE INVENTION

According to the present invention, there is provided a metallic movement roller that moves a strung endless belt, in which protrusions are formed in an outer circumferential surface of a roller main body such that the protrusions are arranged a predetermined distance apart in the direction of a shaft, and in which vertical cross sections with respect to the longitudinal direction of the protrusions are shaped such that the vertical cross sections are triangular and its vertex is displaced from the perpendicular bisector of an opposite side.

Here, preferably, in order for the winding movement and the like of the endless belt to be reduced, the cross sections of the protrusions are shaped such that a predetermined position of the roller main body in the direction of the shaft is a boundary, that on one side in the direction of the shaft with respect to the boundary, the vertex is displaced from the perpendicular bisector of the opposite side to the one side in the direction of the shaft, and that on the other side in the direction of the shaft with respect to the boundary, the vertex is displaced from the perpendicular bisector of the opposite side to the other side in the direction of the shaft. The boundary is preferably the center portion of the roller main body in the direction of the shaft.

All the cross sections of the protrusions may be shaped such that the vertex is displaced from the perpendicular bisector of the opposite side to one side in the direction of the shaft.

The movement roller may be rotated by movement of the endless belt.

According to the present invention, there is also provided a belt driving device using the movement roller described above.

According to the present invention, there is further provided a belt driving device that includes: a movement roller where all the cross sections of the protrusions are shaped such that the vertex is displaced from the perpendicular bisector of the opposite side to one side in the direction of the shaft; and a winding movement restriction unit arranged in the vicinity of an end portion of the movement roller on the other side in the direction of the shaft.

Here, preferably, the winding movement restriction unit includes: a disc-shaped member that is arranged in the vicinity of the end portion of the movement roller on the other side in the direction of the shaft and coaxially with the movement roller; and a circumferential wall that is formed on the inner circumferential surface of an end portion of the endless belt on the other side in the direction of the shaft, in which the disc-shaped member and the circumferential wall restrict movement of the endless belt to the one side in the direction of the shaft.

According to the present invention, there is also provided an intermediate transfer unit including: the belt driving device described above, in which the endless belt is used as an intermediate transfer belt in an image forming device.

According to the present invention, there is further provided an image forming device including the intermediate transfer unit described above.

DESCRIPTION OF PREFERRED EMBODIMENTS

The present invention will be described below in more detail using embodiments, but the present invention is not limited to these embodiments.

Figure 1:
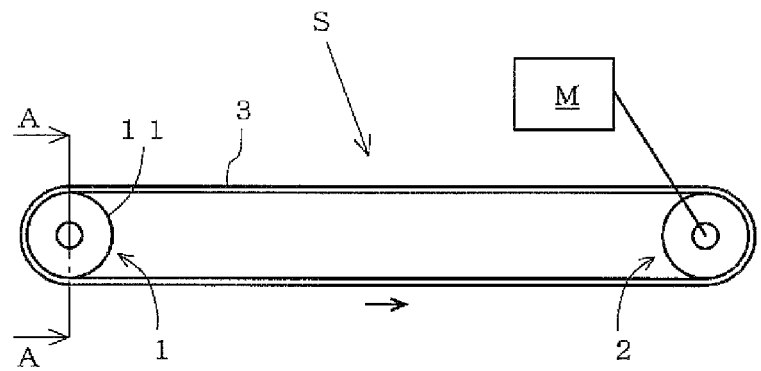
[FIG. 1] A diagram showing the configuration of an example of movement rollers and a belt driving device using them according to the present invention.

FIG. 1 is a schematic diagram showing an example of a belt driving device using movement rollers (hereinafter also simply referred to "rollers") of the present invention. In the belt driving device S shown in the figure, an endless belt 3 is strung between rollers 1 and 2, and the roller 2 is driven to be rotated by a drive motor M and the roller 1 is rotated by the rotation of the roller 2.

Figure 2:
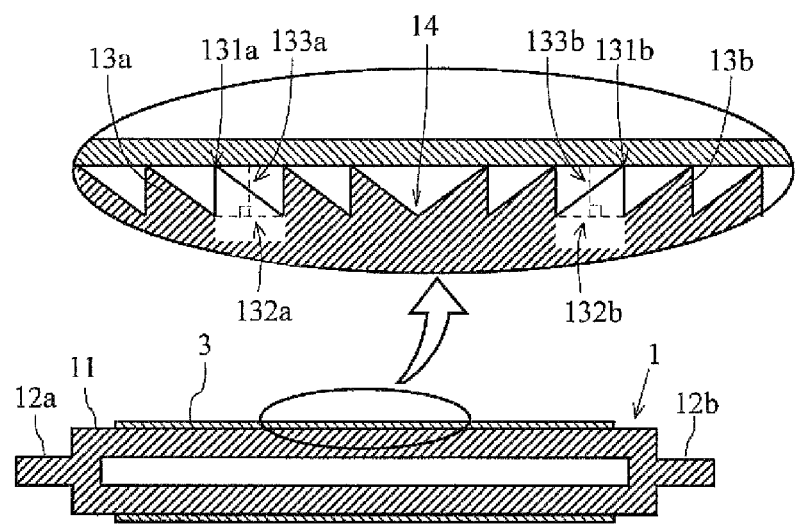
[FIG. 2] A cross-sectional view taken along line A-A of FIG. 1 and an enlarged partial cross-sectional view.

FIG. 2 shows a cross-sectional view taken along line A-A of FIG. 1 and an enlarged partial cross-sectional view. In the roller 1, shaft portions 12a and 12b are formed at both ends of a cylindrical roller main body 11. In the outer circumferential surface of the roller main body 11, a boundary 14 is in a center portion in the direction of the shaft, and protrusions 13a and 13b are provided on the left side of the boundary 14 and the right side of the boundary 14, respectively, such that they are continuous from the boundary 14 in the directions of the ends. The roller main body 11 and the protrusions 13a and 13b are formed integrally with each other.

In the cross-sectional shapes of the protrusions 13a and 13b, vertices 131a and 131b are displaced from perpendicular bisectors 133a and 133b of opposite sides 132a and 132b. Specifically, the boundary 14 is in the center portion of the roller main body 11 in the direction of the shaft, and, in the cross-sectional shape of the protrusions 13a formed on the left side with respect to the boundary 14, the vertex 131a is displaced to the left side from the perpendicular bisector 133a of the opposite side 132a whereas, in the cross-sectional shape of the protrusion 13b formed on the right side with respect to the boundary 14, the vertex 131b is displaced to the right side from the perpendicular bisector 133b of the opposite side 132b.

Figure 3:
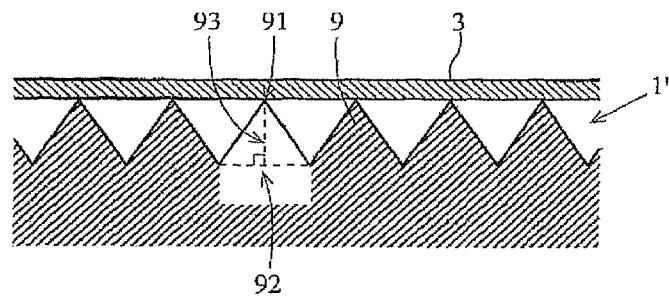
[FIG. 3] An enlarged partial cross-sectional view of a conventional movement roller.

A force produced between the roller 1 and the endless belt 3 at the time of rotation will now be described. FIG. 3 is an enlarged cross-sectional view of the outer circumferential surface of a conventional metallic roller 1' that is formed by general processing. In the surface of the metallic roller 1', protrusions 9 that result from projections and recesses formed by the processing are present, and, in the cross-sectional shape thereof, a vertex 91 is arranged on a perpendicular bisector 93 of an opposite side 92. When the endless belt 3 is rotated, slight vibrations are produced between the metallic roller 1' and the endless belt 3. On the other hand, since a frictional force that is exerted on a contact point between the vertex 91 of the surface of the metallic roller 1' and the endless belt 3 is small, the endless belt 3 is more likely to be moved in the direction of a roller shaft. Especially in a metallic roller, the friction force is smaller than in a resin roller, and thus the endless belt 3 is much more likely to be moved.

Figure 4:
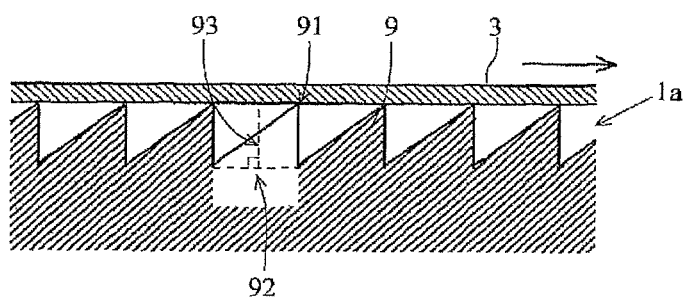
[FIG. 4] A diagram illustrating the movement of an endless belt on the movement roller of the present invention.

It has been found that, when, as shown in FIG. 4, the protrusion 9 was shaped such that, in the cross-sectional shape of the protrusion 9, the vertex 91 was displaced to one side from the perpendicular bisector 93 of the opposite side 92, the endless belt 3 was strung over a roller 1a where the protrusions 9 were repeatedly formed a predetermined distance apart in the outer circumferential surface and the endless belt 3 was rotated, the endless belt 3 was moved in a direction (the right side of the figure) in which the vertex 91 was displaced from the perpendicular bisector 93.

Figure 5:
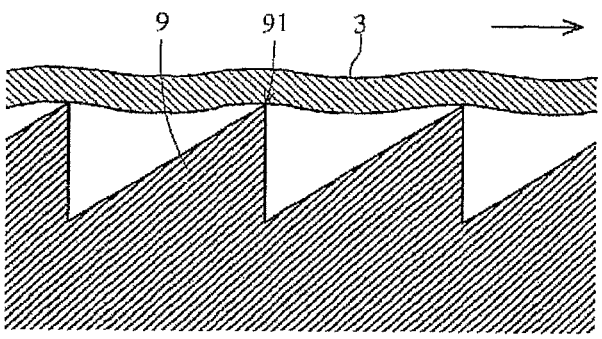
[FIG. 5] An enlarged partial cross-sectional view of FIG. 4.

It is probable that a phenomenon in which such an endless belt 3 is moved to one side in the direction of the roller shaft occurs because, as is understood from an enlarged partial cross-sectional view shown in FIG. 5, the endless belt 3 comes into contact with the vertex 91 of the protrusion 9 and is thus slightly distorted, and this distortion causes the resistance force of the protrusion 9 to the endless belt 3 to differ depending on the direction in which the endless belt 3 is moved. In other words, in FIG. 5, the endless belt 3 is unlikely to be moved in the leftward direction but is likely to be moved in the rightward direction.

With reference back to FIG. 2, in the roller 1 shown in this figure, the protrusion 13a is formed on the left side with respect to the boundary 14 present in the center portion in the direction of the shaft such that the vertex 131a is displaced to the left side from the perpendicular bisector 133a of the opposite side 132a whereas the protrusion 13b is formed on the right side with respect to the boundary 14 such that the vertex 131b is displaced to the right side from the perpendicular bisector 133b of the opposite side 132b. Hence, the endless belt 3 is unlikely to be moved in the rightward direction on the left side with respect to the boundary 14 whereas the endless belt 3 is unlikely to be moved in the leftward direction on the right side with respect to the boundary 14. Consequently, the endless belt 3 is unlikely to be moved in both the directions along the direction of the roller shaft, and thus a failure such as the winding movement is reduced.

The position of the boundary 14 is not limited to the center portion in the direction of the shaft, and the position of the boundary 14 is preferably determined as necessary in consideration of the material and thickness of the endless belt 3, the height of the protrusion 13, the pitch of the formed protrusions 13, and the like. Instead of one boundary, a plurality of boundaries may be provided.

Figure 6:
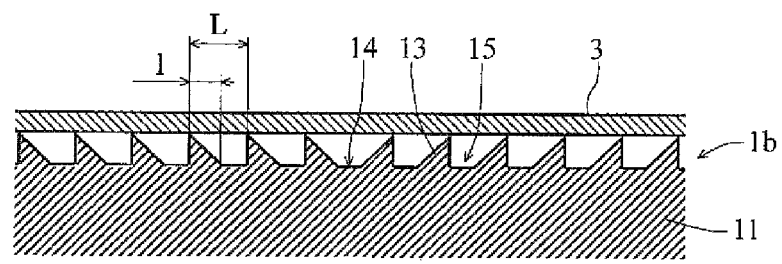
[FIG. 6] An enlarged partial cross-sectional view showing another embodiment of the movement roller of the present invention.

FIG. 6 shows a partial vertical cross-sectional view illustrating another embodiment of the roller of the present invention. A roller 1b shown in this figure differs from the roller of FIG. 2 in that a distance L between the protrusions 13 formed in the outer circumferential surface of the roller main body 11 is greater than the length l of the opposite side of a vertex angle 131. In other words, the roller 1b differs from the roller of FIG. 2 in that a flat portion 15 is formed between the protrusions 13. The shape of the protrusion 13 and the symmetry of the shapes of the protrusions 13 on the right and left sides in the direction of the roller shaft with respect to the boundary 14 are the same as in the embodiment described above.

In the present invention, the height of the protrusion 13 and the distance between the formed protrusions are not particularly limited, and they are preferably determined as necessary in consideration of the material and thickness of the endless belt 3 and the like. An experiment performed by the inventor and the others shows that, when a belt formed of PPS resin having a thickness of 0.12 mm is used as the endless belt 3, the height of the protrusion 13 preferably falls within the range of 1 to 2 μm and the distance between the formed protrusions preferably falls within the range of 0.2 to 1 mm.

A ridge line composed of the vertices of the protrusion 13 formed in the outer circumferential surface of the roller main body 11 needs to intersect the direction of the roller shaft, and more preferably, the ridge line intersects it substantially perpendicularly. The ridge line may be circular, oval or helical. When the ridge line is helical, it may be composed of either a continuous protrusion or a plurality of different protrusions. When the protrusions 13 have the same cross-sectional shape and moreover, the ridge lines of the protrusions 13 are perpendicular to the direction of the roller shaft, the resistance to the movement of the endless belt 3 in the direction of the shaft is largest; the closer the ridge lines of the protrusions 13 are to the direction of the roller shaft, the more the resistance to the movement of the endless belt 3 is increased. The farther the position of the vertex of the protrusion 13 is located from the perpendicular bisector of the opposite side, the more the resistance to the movement of the endless belt 3 in the direction of the shaft is increased.

Figure 7:
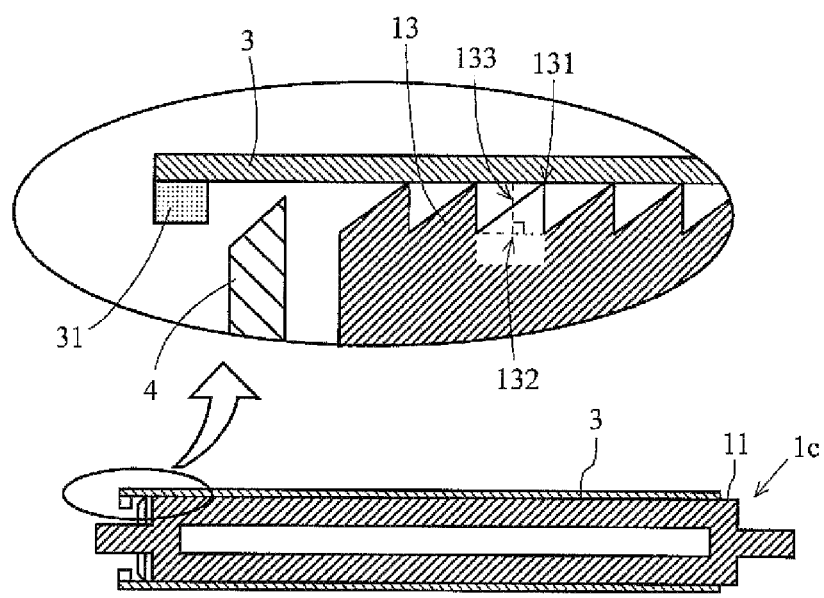
[FIG. 7] A cross-sectional view showing another embodiment of the belt driving device according to the present invention and an enlarged partial cross-sectional view.

Another embodiment of the belt driving device according to the present invention is shown in FIG. 7. In the belt driving device shown in this figure, a roller 1c is used in which, in all cross-sectional shapes of the protrusions 13 formed a predetermined distance apart in the outer circumferential surface of the roller main body 11, vertices 131 are displaced to one side (the right side in this figure) from the perpendicular bisector 133 of an opposite side 132. Outside the left side end of the roller 1c, a disc-shaped member (winding movement restriction means) 4 is attached coaxially with the roller 1c. On the other hand, on the inner circumferential surface of one end (the right side of the figure) of the endless belt 3 strung over the roller 1c, a circumferential wall (winding movement restriction means) 31 is provided. The circumferential wall 31 may be formed integrally with the endless belt 3, or the circumferential wall 31 may be formed as a separate component and attached to the endless belt 3.

In the belt driving device configured as described above, when the roller 1c and the endless belt 3 are driven to be rotated, since the vertex 131 of the protrusion 13 formed in the circumferential surface of the roller main body 11 is displaced to the right side from the perpendicular bisector 133 of the opposite side 132, the endless belt 3 is more likely to be moved in the rightward direction. When the endless belt 3 is moved to the right side and the circumferential wall 31 of the endless belt 3 comes into contact with the disc-shaped member 4, the circumferential wall 31 cannot be moved beyond the disc-shaped member 4, and thus the movement of the endless belt 3 in the rightward direction is prevented at this point. Hence, the endless belt 3 can be moved to the right side until the movement is prevented by the disc-shaped member 4; on the other hand, it is difficult for the endless belt 3 to be moved to the left side due to the resistance of the protrusions 13. Therefore, the endless belt 3 is stably rotated with the circumferential wall 31 in the vicinity of the disc-shaped member 4 or in contact with the disc-shaped member 4.

Figure 8:
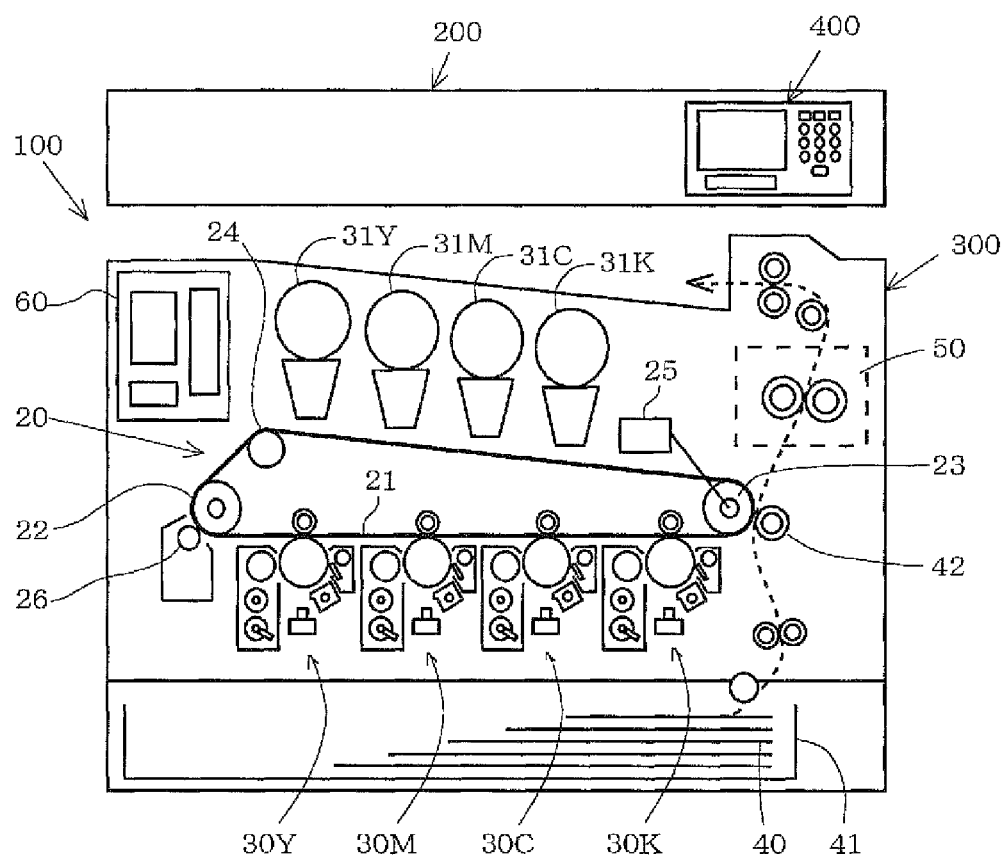
[FIG. 8] A diagram schematically showing the configuration of an example of an image forming device according to the present invention.

An intermediate transfer unit and an image forming device according to the present invention will now be described. FIG. 8 shows a schematic diagram of a tandem color image forming device that is an example of the image forming device of the present invention. The image forming device 100 shown in this figure is composed of: an image reader portion 200 that reads an original document image; a printer portion 300 that reproduces the read image by printing it onto a transfer member; and an operation display portion 400 to which print conditions are input and on which the operation status of the device is displayed. The image reader portion 200 is a known unit that reads an image of an original document placed on an unillustrated original document glass plate while a scanner is being moved; image data that has been read is converted by an image sensor into electrical signals according to the types of colors, and the electrical signals are transmitted to the printer portion 300. The image forming device 100 includes a control portion 60 that controls the operation of the device and stores the image data and that is driven and controlled according to information from various types of sensors and instructions from a user based on designed specifications.

The printer portion 300 forms an image electrophotographically, and an intermediate transfer unit 20 is arranged substantially in the middle of the printer portion 300. The intermediate transfer unit 20 has, as main components, an intermediate transfer belt 21, a drive roller 23 and a follower roller 22 over which the intermediate transfer belt 21 is strung and a tension roller 24 that applies tension to the intermediate transfer belt 21. The intermediate transfer belt 21 is rotated counterclockwise in the figure. The drive roller 23 is driven to be rotated by a drive motor 25. A cleaning brush 26 is pressed onto the follower roller 22 with the intermediate transfer belt 21 sandwiched therebetween. The cleaning brush 26 removes, from the surface of the intermediate transfer belt 21, residual toner that has not been transferred to a transfer member 40.

Below the horizontal bottom portion of the intermediate transfer belt 21, four image forming portions 30Y, 30M, 30C and 30K corresponding to yellow, magenta, cyan and black are arranged side by side. In each of the image forming portions, the surface of a photoconductor is uniformly charged and is then exposed according to image data that has been converted into electrical signals, and thus an electrostatic latent image is formed, and the formed electrostatic latent image is developed by toner to form a visible image. Then, toner images formed according to the colors are primarily transferred to the intermediate transfer belt 21 and are superimposed on each other to form a full-color toner image. Toners are supplied to the image forming portions 30Y, 30M, 30C and 30K from toner containers 31Y, 31M, 31C and 31K corresponding to the individual toners.

The transfer members 40 to be printed are stacked in a tray 41, the transfer members 40 are sequentially fed to a transport path one by one from the uppermost transfer member 40 and the transfer member 40 is fed to a nip portion (secondary transfer region) between the drive roller 23 and a transfer roller 42 according to the rotation of the intermediate transfer belt 21. Then, the toner images formed on the surface of the intermediate transfer belt 21 are transferred to the transfer member 40. Thereafter, while the transfer member 40 passes through a fixing device 50, the toner images are melted and fixed to the transfer member 40 by being heated and pressured, and are ejected into an output tray.

In the image forming device 100 described above, when the intermediate transfer belt 21 of the intermediate transfer unit 20 moves in the direction of a shaft and then moves windingly, colors are displaced when the toner images corresponding to the types of colors are superimposed on each other and positions are displaced when the secondary transfer to the transfer member 40 is performed, with the result that the image quality is reduced. To overcome this problem, the roller described above and according to the present invention is used as the drive roller 23, the follower roller 22 and the tension roller 24 in the intermediate transfer unit 20, and thus the intermediate transfer belt is stably moved and high quality is maintained.

In the image forming device 100, in addition to the intermediate transfer belt 21, for example, a fixing belt may be used in the fixing device 50, and a transport belt may be used as means for transporting the transfer member 40. In order to obtain stable belt movement, it is desirable to use the roller described above and according to the present invention as rollers for rotatably driving these belts.

What is claimed is:

1. A metallic movement roller that moves a strung endless belt,
   wherein protrusions are formed in an outer circumferential surface of a roller main body such that the protrusions are arranged a predetermined distance apart in a direction of a shaft, and
   vertical cross sections with respect to a longitudinal direction of the protrusions are shaped such that the vertical cross sections are triangular and a vertex is displaced from a perpendicular bisector of an opposite side.

2. The movement roller of claim 1,
wherein the cross sections of the protrusions are shaped such that a predetermined position of the roller main body in the direction of the shaft is a boundary,
on one side in the direction of the shaft with respect to the boundary, the vertex is displaced from the perpendicular bisector of the opposite side to the one side in the direction of the shaft and
on the other side in the direction of the shaft with respect to the boundary, the vertex is displaced from the perpendicular bisector of the opposite side to the other side in the direction of the shaft.

3. The movement roller of claim 2,
wherein the boundary is a center portion of the roller main body in the direction of the shaft.

4. A belt driving device comprising the movement roller of claim 3.

5. A belt driving device comprising the movement roller of claim 2.

6. The movement roller of claim 1,
wherein all the cross sections of the protrusions are shaped such that the vertex is displaced from the perpendicular bisector of the opposite side to one side in the direction of the shaft.

7. A belt driving device comprising the movement roller of claim 6.

8. A belt driving device comprising:
the movement roller of claim 6; and
a winding movement restriction unit that is arranged in a vicinity of an end portion of the movement roller on the other side in the direction of the shaft.

9. The belt driving device of claim 8,
wherein the winding movement restriction unit includes a disc-shaped member that is arranged in the vicinity of the end portion of the movement roller on the other side in the direction of the shaft and coaxially with the movement roller and
a circumferential wall that is formed on an inner circumferential surface of an end portion of the endless belt on the other side in the direction of the shaft, and
the disc-shaped member and the circumferential wall restrict movement of the endless belt to the one side in the direction of the shaft.

10. An intermediate transfer unit comprising:
the belt driving device of claim 9,
wherein the endless belt is used as an intermediate transfer belt in an image forming device.

11. An image forming device comprising the intermediate transfer unit of claim 10.

12. An intermediate transfer unit comprising:
the belt driving device of claim 8,
wherein the endless belt is used as an intermediate transfer belt in an image forming device.

13. An image forming device comprising the intermediate transfer unit of claim 12.

14. A belt driving device comprising the movement roller of claim 1.

15. An intermediate transfer unit comprising:
the belt driving device of claim 14,
wherein the endless belt is used as an intermediate transfer belt in an image forming device.

16. An image forming device comprising the intermediate transfer unit of claim 15.

17. The movement roller of claim 1,
wherein the movement roller is rotated by movement of the endless belt.

18. A belt driving device comprising the movement roller of claim 17.

19. The movement roller of claim 1, wherein a ridge line of the protrusion is circular or oval.

* * * * *